US012247595B2

(12) United States Patent
Busani et al.

(10) Patent No.: US 12,247,595 B2
(45) Date of Patent: Mar. 11, 2025

(54) HYDRAULIC CIRCUIT WITH COMBINED COMPENSATION AND ENERGY RECOVERY FUNCTION

(71) Applicant: WALVOIL S.P.A., Reggio Emilia (IT)

(72) Inventors: Ulderico Busani, Reggio Emilia (IT); Davide Mesturini, Reggio Emilia (IT); Gianluca Ganassi, Reggio Emilia (IT)

(73) Assignee: WALVOIL S.P.A., Reggio Emilia (IT)

(*) Notice: Subject to any disclaimer, the term of this patent is extended or adjusted under 35 U.S.C. 154(b) by 387 days.

(21) Appl. No.: 17/527,227

(22) Filed: Nov. 16, 2021

(65) Prior Publication Data

US 2022/0154743 A1 May 19, 2022

(30) Foreign Application Priority Data

Nov. 17, 2020 (IT) ........................ 102020000027561

(51) Int. Cl.
*F15B 21/14* (2006.01)

(52) U.S. Cl.
CPC ..... *F15B 21/14* (2013.01); *F15B 2211/41554* (2013.01); *F15B 2211/428* (2013.01); *F15B 2211/50554* (2013.01); *F15B 2211/52* (2013.01); *F15B 2211/605* (2013.01); *F15B 2211/635* (2013.01);
(Continued)

(58) Field of Classification Search
CPC ............ F15B 21/14; F15B 2211/41554; F15B 2211/428; F15B 2211/50554; F15B 2211/52; F15B 2211/605; F15B 2211/635; F15B 2211/6355; F15B 2211/6658; F15B 2211/67; F15B 2211/88
See application file for complete search history.

(56) References Cited

U.S. PATENT DOCUMENTS 5,992,146 A * 11/1999 Hausman .............. E02F 9/2292 60/494
6,321,534 B1 * 11/2001 A'Hearn ............... E02F 9/2207 60/413
(Continued)

FOREIGN PATENT DOCUMENTS

DE 102016117208 A1 3/2018
IT 201700042145 A1 10/2018
WO 2014121910 A1 8/2014

*Primary Examiner* — Dustin T Nguyen
(74) *Attorney, Agent, or Firm* — Carmel Patent Agency; Robert Ballarini

(57) ABSTRACT

A hydraulic circuit with a compensation and energy recovery function includes a distribution module having at least one spool defining a main delivery branch and a discharge branch. The hydraulic circuit also includes a supply unit and a three-way compensated adjustment device connected to the spool discharge branch and connected to discharge at a second channel. The three-way compensated adjustment device further includes a first piloting line and a second piloting line configured so that a Maximum Load Sensing piloting signal acts on a first side and a Local Load Sensing piloting signal acts on the second side. An energy recovery device and a selection section are configured to receive a signal at reduced pressure and send it to the first piloting line to activate the three-way compensated adjustment device switching to a position where the fluid coming from the discharge branch is sent to the energy recovery device.

16 Claims, 4 Drawing Sheets

(52) U.S. Cl.
CPC ................. *F15B 2211/6355* (2013.01); *F15B 2211/6658* (2013.01); *F15B 2211/67* (2013.01); *F15B 2211/88* (2013.01)

(56) References Cited

U.S. PATENT DOCUMENTS

| | | | | |
|---|---|---|---|---|
| 6,464,864 | B2 * | 10/2002 | Sivavec .................. | B09C 1/002<br>210/170.07 |
| 10,995,475 | B2 * | 5/2021 | Hijikata ................ | E02F 9/2235 |

* cited by examiner

HYDRAULIC CIRCUIT WITH COMBINED COMPENSATION AND ENERGY RECOVERY FUNCTION

FIELD OF APPLICATION

The invention falls within the field of hydraulic distributors intended for managing hydraulic actuators by using pressure compensation devices.

BACKGROUND

A known problem in off-highway applications, such as the ones of excavators, is the one of energy loss due to the work of compensators. An excessive choking of the in/out meter area due to the intervention of the local compensators results in an energy dissipation that is discharged through the fluid in the form of heat. For this reason, it is advantageous to reuse the energy that would otherwise be dissipated through the local compensator by channeling—if the compensator itself allows it—a primary flow into a bypass branch, which, according to the type of movement, redirects the fluid being fed by making the regenerative connection and/or recharges an accumulator or other energy recovery devices.

An example of a hydraulic circuit comprising an energy recovery accumulator used in a hydraulic lifting system is proposed in patent application DE 39 30 553.

Such document describes a hydraulic circuit comprising a compensator arranged on the drain branch of a control valve for a single-effect actuation intended for lifting a load.

An outlet branch from the compensator is connected to the accumulator, to which a flow of fluid is sent under certain operating conditions.

However, known solutions are not efficient enough to operate in all the different working conditions and are not always suitable for use in modern off-highway applications.

SUMMARY

The technical problem at the basis of the present invention is to make available a hydraulic circuit that is structurally and functionally conceived to overcome, at least in part, one or more of the limitations disclosed above with reference to the mentioned known technique.

Within the scope of such technical problem, the object of the present invention is to make available to the known art a hydraulic circuit provided with a three-way compensator capable of combining, with the usual flow adjustment functions that are typical of compensators, the ability to manage a primary flow with the aim of saving energy within the realm of a simple, rational and affordable solution.

A further object is to make available a hydraulic circuit that allows the energy that normally is dissipated in the case of dragging loads or more generally, of inertial loads acting in the same direction as the movement, to be at least partially recovered.

Yet another aim of the invention is to provide a hydraulic circuit that is suitable for use in excavators and, in general, in modern off-highway applications.

These and other purposes are achieved by one or more of the features of the invention set out in independent claim 1. The dependent claims outline preferred and/or particularly advantageous aspects of the invention.

It will be observed that the hydraulic circuit of the present invention comprises a hydraulic distribution module with one or more working sections, and at least one compensated adjustment device, capable of managing a priority flow aimed at energy saving logic.

The distribution module includes at least one spool intended to operate at least one hydraulic utility such as a hydraulic actuator.

According to an aspect of the invention, the circuit comprises a supply unit, preferably with variable flow rate or pressure, configured to supply a flow of operating fluid at a working pressure to the spool delivery channel, for activating the hydraulic utility.

In some embodiments, the compensated adjustment device is connected at its first channel to the spool discharge branch and connected to discharge at a second channel.

Preferably, the compensated adjustment device is piloted on one side by the local load-sensing signal and on the other side by the maximum load-sensing signal.

If there is more than one section, the maximum load-sensing signal corresponds to that of the highest-pressure working section.

Another aspect is that the compensated adjustment device is connected to the energy recovery device, which is responsible for implementing energy-saving logics, for example based on a regeneration system.

It will be appreciated that the circuit of the present invention is also configured to receive a reduced pressure signal, which enables the compensated adjustment device to be activated in the case of driving and inertial loads acting in the same direction as the movement. The reduced pressure signal preferably has a lower value than the working pressure and acts on the compensated adjustment device of the maximum load-sensing signal. In some embodiments, the reduced pressure value can be comprised between 15 and 20 bar, for example.

Based on such pilot control, the compensated adjustment device is switched to direct the discharge flow from the spool towards the energy recovery device.

It will therefore be appreciated that in this way, even in the case of dragging loads, a case in which the hydraulic actuator would supply a high flow rate of fluid in discharge, requiring a low pressure value in delivery, it is possible to activate the compensated adjustment device in order to implement the energy recovery logic that the circuit of the present invention provides.

In some embodiments, the reduced pressure signal can be generated from the working pressure by means of a pressure-reducing valve. Preferably the pressure-reducing valve can be connected to a delivery line coming from the supply unit.

According to another aspect, the reduced pressure signal can be provided by an external source of low-pressure auxiliary operating fluid.

Therefore, it will be appreciated that the reduced pressure signal adopted in the circuit of the present invention can be easily obtained either by using the same flow rate of operating fluid already intended to activate the different sections, or by a simple connection to an external low pressure source.

It will be appreciated that in the context of the present invention the term "low pressure" means a pressure significantly lower than that required for the operation of the hydraulic utilities envisaged by the application, for example a value comprised between 15 and 20 bar, as specified above. However, it is clear that this value will be linked to the effective application of the hydraulic circuit.

According to another advantageous aspect of the invention, the passage of the reduced pressure towards the relevant piloting line of the compensated adjustment device is adjusted by means of a selection device, which may comprise a two-way valve.

In this way it is possible to achieve pilot control even in situations of dragging loads or other specific situations, in a simple and easily controllable manner.

In some designs, the two-way valve, or other selection device used, is electrically controlled.

It can also be envisaged that the spool will discharge the reduced pressure under specific conditions. For this purpose, the spool may include an additional way connected via a respective line to the reduced pressure. Preferably, the spool is configured to close this additional way or connect it to a drain depending on its operational position.

Advantageously, the spool can be activated via electro-hydraulic controls. It will be appreciated, however, that different activations can also be provided, e.g. mechanical, hydraulic and electromechanical.

In yet another aspect, the hydraulic circuit comprises a choke arranged in a shunt from the first piloting line towards the discharge.

The presence of the choke prevents the accumulation of pressure on the maximum LS signal line and ensures rapid depressurization of the system.

According to another aspect of the invention, the two-way valve, or other selection device used, can be operated electrically, hydraulically or mechanically. For this purpose, there may be a control unit which, in the presence of a dragging load acting on the actuator of the working section, sends an electrical, hydraulic or mechanical command to switch the valve.

Said objects and advantages are all achieved by the hydraulic circuit, the object of the present invention, which is characterized by the provisions of the claims below.

BRIEF DESCRIPTION OF THE DRAWINGS

This and other characteristics will be more apparent from the following description of certain embodiments illustrated by way of mere non-limiting example in the accompanying drawings, in which.

DETAILED DESCRIPTION OF THE INVENTION

Figure 1:
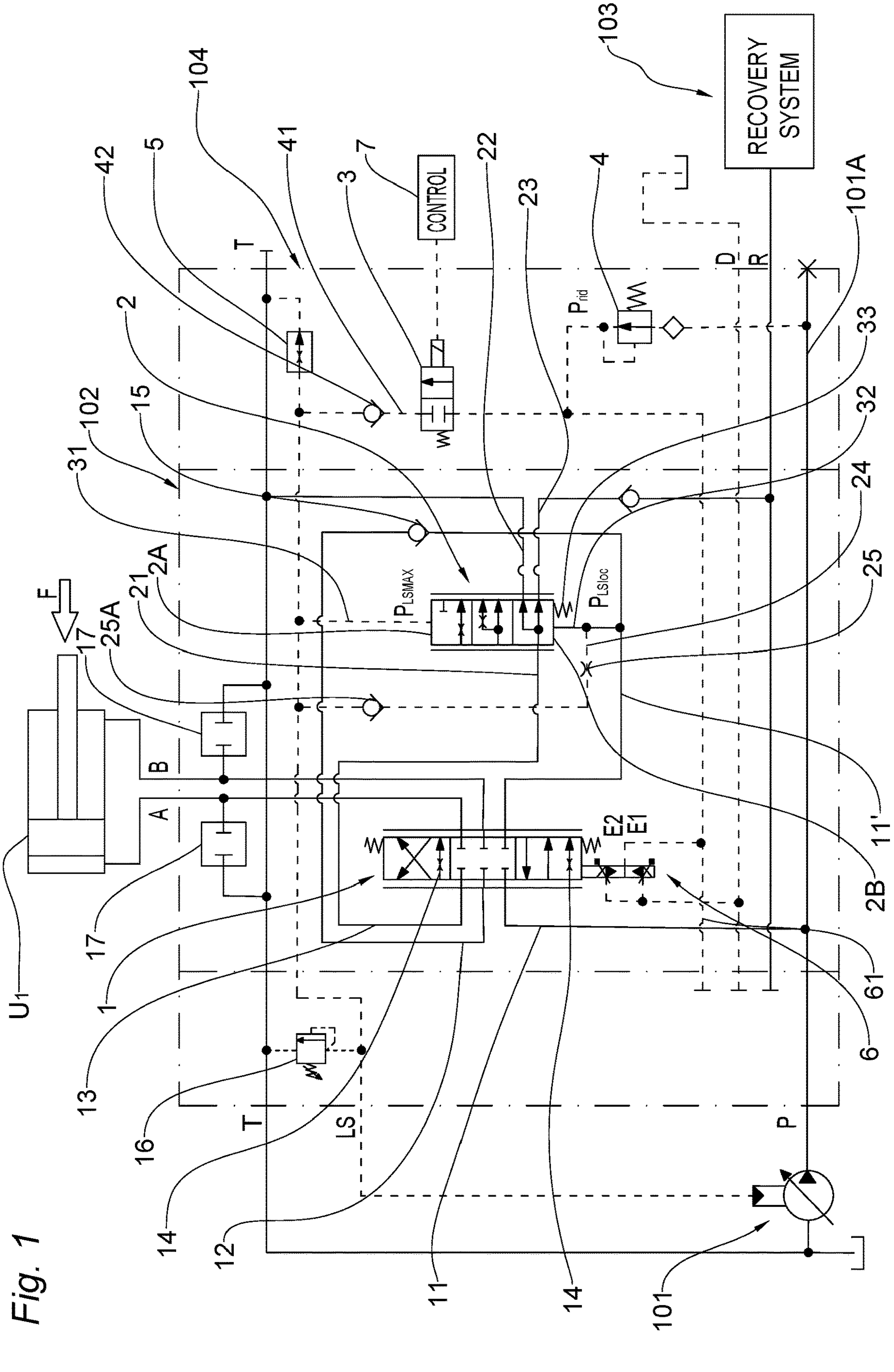
FIG. 1 is a schematic drawing of a hydraulic circuit with a compensation and energy recovery function according to the present invention.

With initial reference to FIG. 1, a hydraulic circuit according to the present invention is shown as a whole with numeral 100.

As is noted below, the hydraulic circuit 100 of the present invention has the function of compensation and energy recovery.

The hydraulic circuit 100 is preferably supplied by means of a supply unit 101. The supply unit 101 may be of the variable flow or pressure type, as in the example embodiment shown in the figure. However, other solutions may be provided for the adjustment of the power unit 101.

Figure 4:
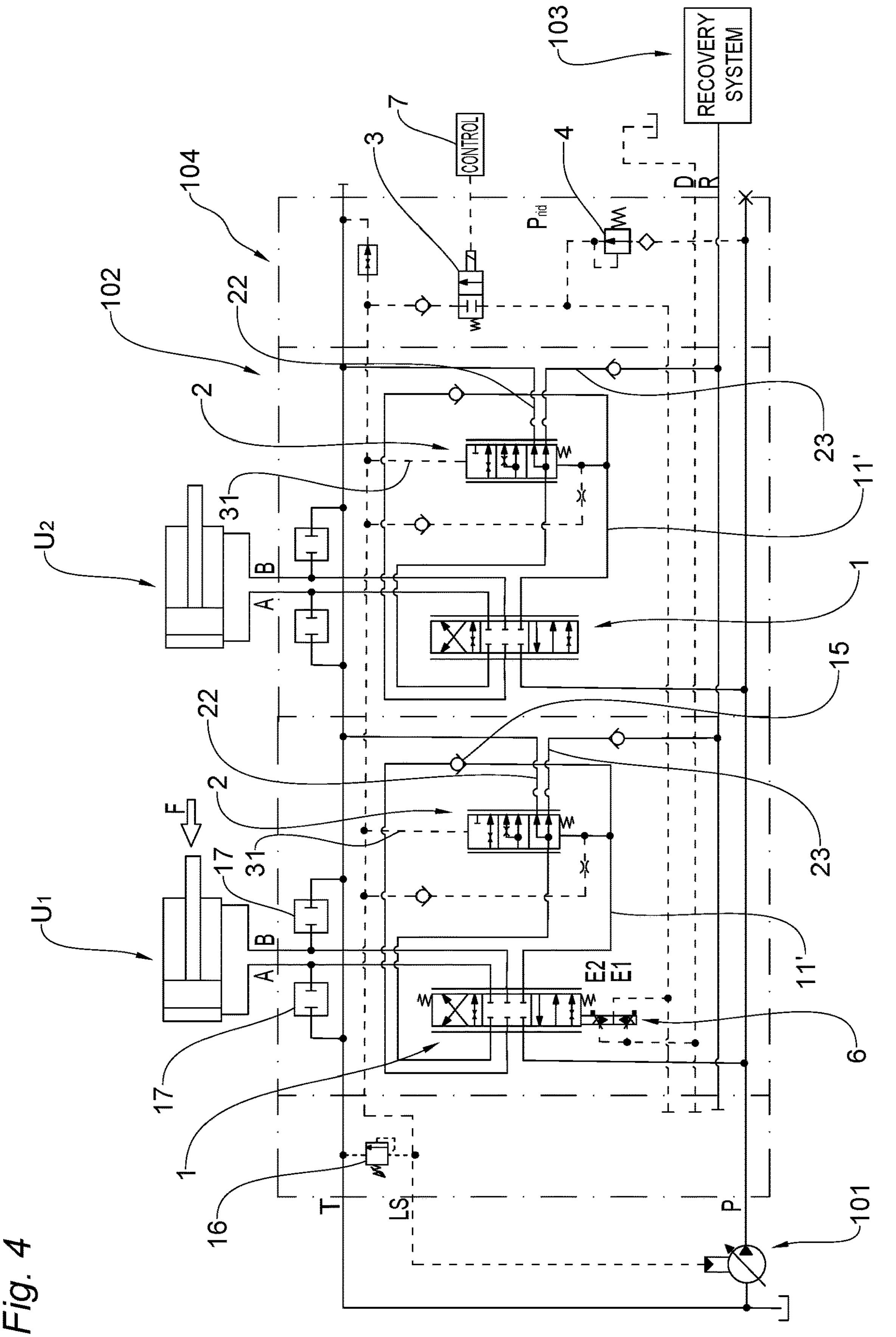
FIG. 4 is a schematic drawing of a hydraulic circuit with a compensation and energy recovery function according to the present invention, illustrating the configuration of the circuit when there are two working sections.

In some embodiments, the supply unit 101 may comprise a variable displacement pump, which adjusts the flow rate based on the pressure of the highest pressure utility among those supplied by the supply unit. The example in FIG. 4 illustrates, for example, the hydraulic circuit 100 in the case where the supply unit 101 is intended to supply two hydraulic utilities U1, U2. It should be noted that there can also be a larger number of utilities, as indicated above.

However, the invention will be illustrated below in the case of a single hydraulic utility U1, as in the example of FIG. 1. The hydraulic utility U1 can for example be represented by the operation of a double-acting hydraulic actuator or any other hydraulic apparatus. It will be appreciated that the same inventive concepts set out in connection with the present invention are also applicable to other solutions, such as a hydraulic motor. For this reason, the term "hydraulic utility" is used below to refer to any hydraulic apparatus intended to be operated via a hydraulic circuit with one or more working sections.

The hydraulic circuit 100 comprises a distribution module 102 that receives a flow rate of operating fluid from the supply unit 101 to distribute the fluid towards the hydraulic utility U1. As mentioned above, it should be noted that although there is only one utility in the illustrative embodiment shown in FIG. 1, the present invention may also be applied in the case of a generic number of users n and corresponding work sections.

a. The distribution module comprises a spool 1 for operating the hydraulic utility. In the case of several sections intended to supply several utilities, it is preferable to have a corresponding number of spools, as in the example shown in FIG. 4 where there are two sections and two corresponding spools 1.

The spool 1 defines a main delivery branch 11, which receives a flow of fluid from the supply unit 101, and a discharge branch 13 through which the fluid exiting the hydraulic utility U1, for example from the hydraulic actuator illustrated in the example embodiment of the figures, transits.

Preferably, the spool comprises a delivery notch 14 through which the flow of fluid supplied by the supply unit 101 transits.

In some embodiments, the circuit comprises a secondary delivery branch 12, to which the main delivery branch 11 is connected. A check valve 15 is preferably located between the secondary delivery branch 12 and the main pressure branch 11. The delivery notch 14 is therefore advantageously configured such that the operating fluid transiting between the main delivery branch 11 and the secondary delivery branch 12 passes through the notch 14.

The hydraulic circuit 100 of the present invention further comprises one or more three-way compensated adjustment devices 2, preferably in a number equal to the working sections of the circuit, and whose features will be explained in detail below.

As can best be appreciated from the example illustrated in FIG. 1, the compensated three-way adjustment device 2 is connected, at a first channel thereof 21, to the discharge branch 13 of the spool 1 and connected to discharge T at a second channel 22.

A third channel 23 of the three-way compensated adjustment device 2 is connected to an energy recovery device 103, the latter being illustrated in more detail below.

The adjustment device 2 can be adjusted, preferably by continuous adjustment, between three adjustment positions implemented via specific piloting signals. It will be understood that the term continuous adjustment means the ability to move gradually and continuously between positions. In other words, the opening and closing of a window of the adjustment device 2 takes place in a gradual manner, passing progressively from the closed to the open condition.

According to a preferred embodiment, the piloting signals are provided by a respective first piloting line 31 through which a Maximum Load Sensing signal PLSmax acts on a first side 2A of the adjustment device 2, and by a second piloting line 32 through which a Local Load Sensing signal PLSloc acts on a second side 2B. It will be appreciated that the areas defined by sides 2A and 2B respectively are preferably equal.

In some embodiments, on the second side 2B, in addition to the pressure provided by the local Load Sensing signal $P_{LSloc}$, an additional force may also act, preferably defined by the action of a spring, or an equivalent elastic element 33. However, it will be appreciated that additional force can be provided alternatively or additionally by means of hydraulic piloting acting on one of the sides of the adjustment device.

According to a further aspect, a connecting channel 24 may be provided which sends the signal taken from the second piloting line 32 to the first piloting line 31, passing through a relative notch 25 and a non-return valve 25A.

It will be appreciated that the pressure of the maximum Load Sensing signal $P_{LSmax}$ is advantageously characteristic of the pressure of the higher pressure hydraulic utility if more than one section is present. Obviously, if there is only one utility U1, the pressure of the maximum Load Sensing signal $P_{LSmax}$ can correspond to that of such utility.

According to a further aspect, the pressure of the local Load Sensing signal PLSloc is taken from a section 11' through which the working fluid is supplied from the supply unit 101 to the hydraulic utility U1. Preferably, the second piloting line 32 is for this purpose connected to the section 11' of the main delivery branch 11 downstream of the spool 1 from which the Local Load Sensing signal PLSloc is supplied.

It will also be appreciated that, according to a preferred embodiment, where there is more than one working section, the Load Sensing signals from the various sections can be selected by selector valves, not shown in the diagram, so that the highest is taken to the supply unit, which in turn generates a supply pressure of a value equal to the Maximum Load Sensing plus a preset margin. Alternatively, the signals can be selected by the compensated adjustment controller 2.

The circuit may also include an optional valve device 17 which allows the pressure value on one or both of the two channels A, B of the actuator of the hydraulic utility U1 to be limited according to the movement of the actuator and any load present.

In preferred embodiments, a pressure-limiting valve 16 located on the signal line $LS_{MAX}$ allows the maximum pressure value of the system to be defined.

Preferably, the adjustment device 2 is kept normally open and, in a first position, is configured so that the first channel 21 is in connection with the energy recovery device 103 and a discharge line T. In this condition, the flow is therefore preferentially sent to the discharge T.

As the difference in pressure between the first piloting line 31 and the second piloting line 32 increases, the regulator device starts moving towards a second position. In this intermediate position, the connection to the recovery device 103 is maintained via the third channel 23. In some embodiments, the connection to the discharge T is instead throttled in this second position. In this way, the hydraulic flow is sent as a priority to the energy recovery device 103.

In the third position, the drawer completely closes all passages or throttles them to the point of ensuring the necessary pressure for all operating conditions, preventing the flow from being directed to the discharge or to the energy recovery device 103. For this purpose, in the third position the fluid flow to the discharge channel 22 and to the energy recovery device 103 can be prevented or the fluid flow to the second channel 23 can be sent by means of a choked passage so as to guarantee the necessary pressure for all the operating conditions.

It will be appreciated that, as mentioned above, the device 2 is configured to move gradually between positions, closing the channels, or throttling them, in a progressive manner.

Again with reference to FIG. 1, in the movement of actuators in the presence of dragging loads, for example under return conditions of the actuator with the external force F in a concordant direction with the displacement of the actuator, the flow rate outlet from the energy recovery line may be redirected, possibly through a check valve to the energy recovery device(s) 103 in order to store potential hydraulic energy to be used again in new active working steps.

More generally, the adjustment device 2 may be configured so as to intervene if the utility actuated by the spool is subjected to an inertial load F that acts in the same direction as the displacement of the actuator.

In order to ensure correct operation under all inertial load conditions F, the present invention provides for a selection section 104 by means of which a reduced pressure signal $P_{rid}$ is introduced into the circuit to be sent to the first piloting line 31 under predetermined conditions.

Preferably, these conditions are determined by lowering the pressure of the maximum load-sensing signal $P_{LSmax}$ below a predetermined pressure value, which may correspond to the reduced pressure value $P_{rid}$.

The reduced pressure $P_{rid}$ normally has a lower value than the working pressure P and, in some embodiments, can have a value comprised between 15 and 20 bar. Obviously, different values may also be envisaged depending on the specific type of application.

As can be seen from the figures, the adjustment device 2 moves between its positions according to the difference between the Maximum Load Sensing $P_{LSmax}$ and Local Load Sensing $P_{LSloc}$ signals, i.e. the signals present on sides 2A and 2B of the device 2, respectively.

The possibility of providing the reduced pressure signal Prid makes it possible to prevent the pressure on the side 2B of the Maximum Load Sensing signal $P_{LSmax}$ from falling below a predetermined value, defined by the reduced pressure. This allows the adjustment device 2 to be properly controlled, even under load conditions, for example, where there is low pressure and a high flow rate in the section.

In general, the adjustment device 2 may be configured in such a way that the flow is sent in a priority manner, via the channel 23, to the energy recovery device 103, at least as far as this is able to accept operating fluid.

Based on the difference between the Maximum Load Sensing signal $P_{LSmax}$ and the Local Load Sensing signal $P_{LSloc}$, the adjustment device 2 changes its position in such a way that it performs an adjustment action, i.e. it directs the operating fluid flow in such a way that a balanced situation is restored.

If the pressure of the Maximum Load Sensing signal $P_{LSmax}$ is greater than that of the Local Load Sensing signal $P_{LSloc}$, possibly net of the action of the spring 33, then the recovery device 2 tends to close the passage of operating fluid to the discharge and to throttle or close the passage towards the recovery device 103.

Vice versa, if the pressure of the Local Load Sensing signal $P_{LSloc}$ is greater than that of the Maximum Load Sensing signal $P_{LSmax}$, then the adjustment device 2 tends to open both the passage to discharge and the passage towards the recovery device, id the fluid will be sent in priority to discharge.

These situations tend to bring the Maximum Load Sensing $P_{LSmax}$ and Local Load Sensing $P_{LSloc}$ signals back into balance, thus achieving the adjustment function by the device 2.

When the reduced-pressure signal Prid is sent to the first piloting line 31, an unbalanced situation may then occur in the adjustment device 2. In other words, according to the above, when the adjustment device 2 feels the pressure Prid, it will tend to move to try to replicate the pressures, returning to a balanced condition.

For example, under dragging load conditions it may occur that, after the reduced pressure signal Prid has been sent, it moves towards the position where the fluid is sent to the recovery device 103. If, therefore, initially the pressure of the Load Sensing Local signal $P_{LSloc}$ prevails over the reduced pressure Prid and the fluid is sent predominantly to discharge, the adjustment device 2 gradually moves to a position such that the fluid is sent to the recovery device 103, at least as long as the operating conditions of the latter permit it. In fact, the reduced pressure signal tends to be copied onto the local load-sensing signal $P_{LSloc}$ to restore a balanced situation.

In other words, by providing for the presence of the reduced pressure signal Prid in specific load conditions, such as in the case of a dragging load, it is therefore possible to activate the compensated three-way adjustment device 2 in switching towards the second position, i.e. in the position in which the fluid coming from the discharge branch 13 is sent to the energy recovery device 103.

It will be appreciated that according to yet another aspect, there is a choke 5 arranged in derivation from the first piloting line 31 towards discharge. Thanks to the presence of the choke 5, it is possible to depressurize the circuit quickly when the recovery device 2 returns to the central position.

Preferably, the reduced pressure signal Prid is supplied to the Maximum Load Sensing $P_{LSmax}$ line via a corresponding channel 41. In order to prevent the Maximum Load Sensing signal $P_{LSmax}$ from being sent towards the reduced pressure section 104, a check valve 42 located along the channel 41 may be provided.

In some embodiments the sending of the reduced pressure to the first piloting line 31 is adjusted by means of a two-way valve 3. The non-return valve 42 can in this case be interposed between the two-way valve 3 and the Maximum Load Sensing signal $P_{LSmax}$ line.

a. The two-way valve 3 may be controlled electrically, hydraulically or mechanically in the presence of a dragging load F acting on the actuator of the hydraulic utility U1 in such a way that it switches to a position in which the reduced pressure fluid Prid is sent towards the first piloting line 31.

The valve 3 can be activated whenever the spool 1 is piloted to perform a movement with a dragging load, such as lowering an excavator arm.

Alternatively, the two-way valve can be actuated by a mechanical device or hydraulic pilot control.

Therefore, in general, there may be a control unit 7, which is responsible for adjusting the activation of the valve 3 according to the position of the spool 1.

It will also be appreciated that the valve can be replaced by different selection devices 3 designed to send the flow at reduced pressure under predetermined conditions.

Figure 3:
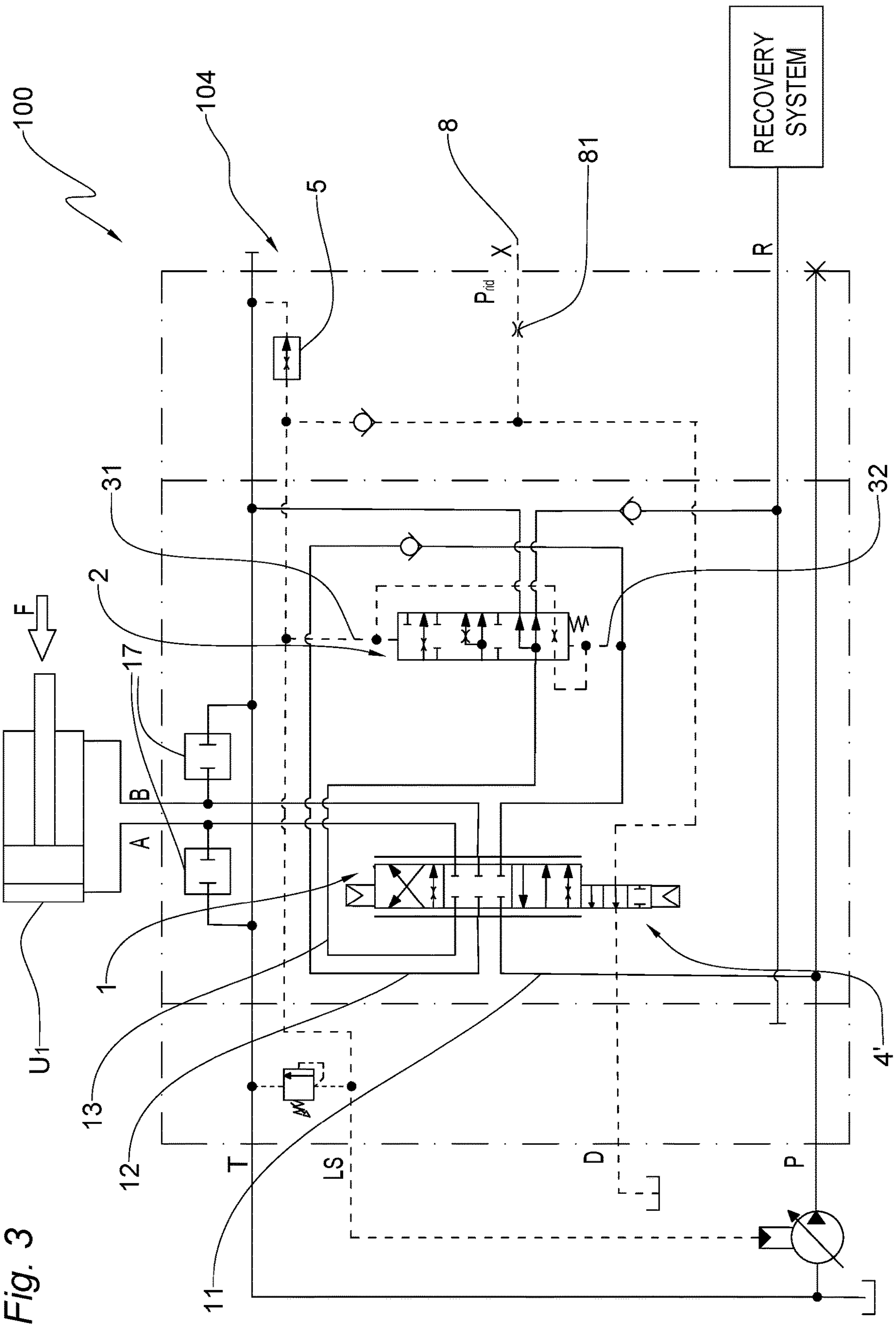
FIG. 3 is a schematic drawing of a hydraulic circuit with a compensation and energy recovery function according to a further embodiment of the present invention.

For example, in some embodiments, such as the one shown in FIG. 3, it may be provided that the spool 1 includes an additional way 4' connected via a respective line to the reduced pressure Prid.

The spool 1 is therefore configured to close this additional way 4' or connect it to a drainage outlet D depending on its operating position, in a manner conceptually similar to that described in relation to the embodiment of FIG. 1.

Referring again to FIG. 1, in some embodiments, the selection section 104 comprises a pressure-reducing valve 4 configured to reduce the working pressure P to the reduced pressure Prid. Preferably, the pressure-reducing valve 4 is connected to a delivery line 101A of the supply unit 101.

The pressure reducing valve 4 is set in such a way that the outlet pressure is the reduced pressure Prid intended for the system, i.e. in the example described above a pressure comprised between 15 and 20 bar.

It will also be appreciated that in some embodiments, as can be seen from FIG. 1, the reduced pressure Prid can also be used to activate the spool 1.

This is particularly advantageous when spool 1 is activated by electro-hydraulic controls 6.

In such a case, a control line 61 may be provided through which the reduced pressure Prid is supplied to the electro-hydraulic controls 6 for operating the spool 1.

If there is a pressure-reducing valve 4, the control line 61 is therefore advantageously connected to the valve 4.

In order to obtain the energy recovery action required, based on one aspect of the invention, the energy recovery device 103 may comprise at least one collector that allows storing the hydraulic fluid in the cases in which the working conditions of the circuit allow it. It should be noted, however, that energy recovery within the scope of the present invention does not necessarily involve an accumulator.

According to a further aspect of the invention, the energy recovery device 103 may be configured so as to reintroduce potential hydraulic energy back into the distribution module 102 that feeds the working sections, in other words, thus providing the feeding line of the hydraulic module with hydraulic fluid, for example collected in the collector.

Based again on another aspect, the energy recovery device 103 may be configured so as to transfer said hydraulic fluid to a system or device for transforming potential hydraulic energy provided by said hydraulic fluid into another form of energy. For example, the device for transforming potential hydraulic energy may be depicted by an alternator, generator or a flywheel.

It in any case is understood that also other solutions suitable for energy recovery may be provided within the realm of the circuit of the present invention, and the above examples are to be intended as given merely by way of non-limiting example.

Figure 2:
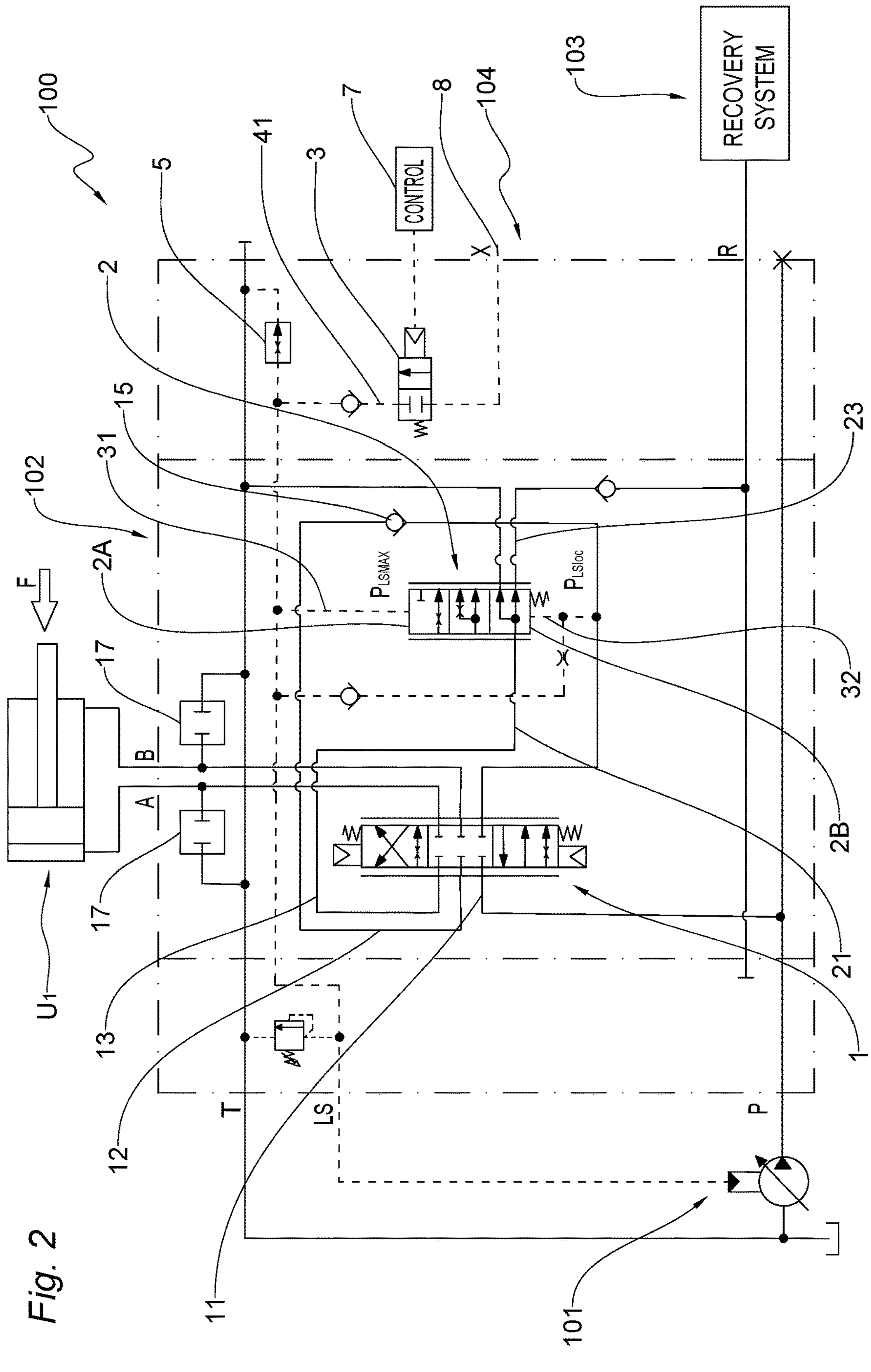
FIG. 2 is a schematic drawing of a hydraulic circuit with a compensation and energy recovery function according to one embodiment of the present invention.

Referring now to the example in FIG. 2, an alternative embodiment of the present invention will be described, whereby an external source 8 is used to supply the reduced pressure Prid.

For this purpose, the selection section 104 is configured to receive said reduced pressure Prid from an external source 8 of low-pressure auxiliary operating fluid.

The embodiment illustrated in FIG. 3 may also provide for reduced pressure to be supplied by the external source 8.

In this case, as previously described, the reduced pressure Prid is also used in the additional way 4' of the spool 1 and, for this purpose, a narrowing 81 may also be provided in the selection section 104 along the line connected to the external source 8. It will be appreciated that the narrowing 81 prevents excessive fluid flow in the piloting channel, thus preventing saturation of the circuit.

In any case, these solutions can also be combined with all the embodiments described above.

It will therefore be appreciated that the circuit of the present invention enables the functions of compensation and energy recovery to be carried out effectively, even in the case of inertial loads acting in the same direction as the movement and such as to generate higher speeds than those generated by the flow rate at the outlet.

The invention claimed is:

1. A hydraulic circuit having a compensation and energy recovery function, comprising:
- a distribution module for distributing hydraulic fluid which includes at least one spool for actuating at least one hydraulic utility, wherein:
  - the at least one spool is configured to define a main delivery branch, and a discharge branch in the distribution module,
- a supply unit configured so as to supply a flow rate of operating fluid at a working pressure to the main delivery branch, for activating the at least one hydraulic utility;
- a three-way compensated adjustment device connected, at a first channel thereof, to the discharge branch of the at least one spool and connected to discharge at a second channel;
  - the three-way compensated adjustment device further comprises a first piloting line and a second piloting line configured so that a Maximum Load Sensing piloting signal acts on a first side of the three-way compensated adjustment device, which signal is characteristic of the pressure of the at least one hydraulic utility if there is a single section, or of the at least one hydraulic utility at higher pressure if there is more than one section, and so that a Local Load Sensing piloting signal acts on a second side of the three-way compensated adjustment device, which signal is characteristic of a local pressure of the operating fluid supplied to said at least one hydraulic utility by the supply unit,
- the hydraulic circuit further comprises:
- an energy recovery device connected to a third channel of the three-way compensated adjustment device;
- a selection section configured in such a way as to receive a signal at reduced pressure and send the signal to said first piloting line in such a way as to activate said three-way compensated adjustment device for switching towards a position in which the fluid coming from the discharge branch is sent to said energy recovery device connected through said third channel.

2. The hydraulic circuit according to claim 1, wherein said selection section comprises a pressure reducing valve configured in such a way as to reduce said working pressure to said signal of reduced pressure.

3. The hydraulic circuit according to claim 2, wherein said pressure reducing valve is connected to a pressure line of the supply unit.

4. The hydraulic circuit according to claim 1, wherein said selection section comprises a selection device configured to selectively allow and prevent the passage of said signal of reduced pressure to said first piloting line.

5. The hydraulic circuit according to claim 4, wherein the selection device comprises a two-way valve.

6. The hydraulic circuit according to claim 4, comprising a control unit configured to actuate said selection device electrically, hydraulically or mechanically, in the presence of a dragging load which acts on an actuator of said hydraulic utility.

7. The hydraulic circuit according to claim 4, wherein said selection device is electrically controlled.

8. The hydraulic circuit according to claim 1, wherein said at least one spool comprises an additional way connected through a respective line to said signal of reduced pressure, said at least one spool being configured to close said additional way or to connect said additional way to a drainage discharge according to an operating position thereof.

9. The hydraulic circuit according to claim 1, wherein said at least one spool is activated by electrohydraulic commands and further comprises a command line through which said reduced pressure signal is supplied to said electrohydraulic commands for actuating the at least one spool.

10. The hydraulic circuit according to claim 1, wherein said selection section is configured to receive said reduced pressure signal from an external source of auxiliary operating fluid at low pressure.

11. The hydraulic circuit according to claim 1, wherein said supply unit supplies variable flow rate or pressure.

12. The hydraulic circuit according to claim 1, wherein said selection section comprises a reduced pressure signal channel connected to said first piloting line and a check valve placed along said reduced pressure signal channel configured to prevent fluid of the Maximum Load Sensing signal from being sent to said selection section through said reduced pressure signal channel.

13. The hydraulic circuit according to claim 1, wherein the Maximum Load Sensing piloting signal acts on said first side of the three-way compensated adjustment device through the first piloting line and the Local Load Sensing piloting signal acts on a second side of the three-way compensated adjustment device through the second piloting line.

14. The hydraulic circuit according to claim 1, wherein the reduced pressure value is comprised between 15 and 20 bar.

15. The hydraulic circuit according to claim 1, comprising three-way compensated adjustment devices in a number equal to a number of working sections in the circuit.

16. The hydraulic circuit according to claim 1, comprising an elastic element configured to generate a force on said second side, in addition to the pressure provided by the Local Load Sensing signal.

* * * * *